(12) United States Patent
Abe

(10) Patent No.: US 8,260,058 B2
(45) Date of Patent: Sep. 4, 2012

(54) TEMPLATE MATCHING DEVICE, CAMERA WITH TEMPLATE MATCHING DEVICE, AND PROGRAM FOR ALLOWING COMPUTER TO CARRY OUT TEMPLATE MATCHING

(75) Inventor: Hiroyuki Abe, Yokohama (JP)

(73) Assignee: Nikon Corporation, Tokyo (JP)

( * ) Notice: Subject to any disclaimer, the term of this patent is extended or adjusted under 35 U.S.C. 154(b) by 415 days.

(21) Appl. No.: 12/448,364

(22) PCT Filed: Mar. 5, 2008

(86) PCT No.: PCT/JP2008/000449
§ 371 (c)(1),
(2), (4) Date: Jun. 18, 2009

(87) PCT Pub. No.: WO2008/111290
PCT Pub. Date: Sep. 18, 2008

(65) Prior Publication Data
US 2010/0091125 A1    Apr. 15, 2010

(30) Foreign Application Priority Data
Mar. 13, 2007   (JP) ................. 2007-062947

(51) Int. Cl.
*G06K 9/62* (2006.01)
*G06K 9/64* (2006.01)
*G06K 9/00* (2006.01)
(52) U.S. Cl. .................. 382/209; 382/278; 382/165
(58) Field of Classification Search .............. 382/209, 382/165, 278, 170, 199, 282
See application file for complete search history.

(56) References Cited

U.S. PATENT DOCUMENTS
2007/0064233 A1   3/2007   Takagi et al.

FOREIGN PATENT DOCUMENTS

| JP | A-5-81433 | 4/1993 |
|---|---|---|
| JP | A-8-237469 | 9/1996 |
| JP | 2005293334 A * | 10/2005 |
| JP | A-2005-293334 | 10/2005 |
| JP | A-2005-352543 | 12/2005 |
| WO | WO 2005/101313 A1 | 10/2005 |

OTHER PUBLICATIONS

Notification Concerning Transmittal of International Preliminary Report on Patentability (Form PCT/IB/326) and English language translation (Form PCT/IB/338).

* cited by examiner

*Primary Examiner* — Lin Ye
*Assistant Examiner* — Mekonnen Dagnew
(74) *Attorney, Agent, or Firm* — Oliff & Berridge, PLC

(57) ABSTRACT

A template-matching apparatus includes a first calculating unit calculating a first characteristic amount from the image information of a template image, and extracting unit extracting a partial image, a second calculating unit calculating for image information of the partial image a second characteristic amount, a third calculating unit calculating a residual amount from the image information of the template image and the partial image, a first computing unit finding a first degree of similarity, a second computing unit that finds a second degree of similarity based on the residual amount, a third computing unit finding a third degree of similarity based on the first and second degree of similarity, and a specifying unit specifying a matching position, thereby specifying the matching position with good accuracy even if the input image is observed with some geometrical change.

12 Claims, 6 Drawing Sheets

(TEMPLATE IMAGE) 22

(PARTIAL IMAGE FOR COMPUTATION USE) 24

TEMPLATE MATCHING DEVICE, CAMERA WITH TEMPLATE MATCHING DEVICE, AND PROGRAM FOR ALLOWING COMPUTER TO CARRY OUT TEMPLATE MATCHING

CROSS-REFERENCE TO RELATED APPLICATION

This application is a U.S. National Stage application claiming the benefit of prior filed International Application Number PCT/JP2008/000449, filed Mar. 5, 2008, in which the International Application claims a priority date of Mar. 13, 2007 based on prior filed Japanese Application Number 2007-062947, the entire contents of which are incorporated herein by reference.

TECHNICAL FIELD

The present application relates to a template-matching apparatus that performs template matching with respect to images, a camera provided with the template-matching apparatus, and a program for performing template matching with a computer.

BACKGROUND ART

Template matching is a process of searching an input signal for a partial signal (target) that matches any known template signal, and specifying the position of the target (matching position) thereby. With such a process, matching computation is repeatedly performed between the partial signal extracted from the input signal for the computation use and the known template signal while the partial signal for the computation use is being moved in position for extraction. Thereafter, the results of the matching computation at the respective positions in the input signal are compared in size with one another so that the matching position is specified.

Moreover, for the matching computation, used are the well-known cross-correlation algorithm, the sequential similarity detection algorithm, and others (as an example, refer to Patent Document 1). Such algorithms are those for computing the signal strength for the partial signal for computation use and the template signal in terms of their correlated positions, and compiling the result for the signal in its entirety.

Patent Document 1: Japanese Unexamined Patent Application Publication No. H5-81433

DISCLOSURE

Problems to be Solved

However, such a method described above as computing the signal strength for the partial signal for computation use and the template signal in terms of their correlated positions has the following problem. For example, with a two-dimensional input signal including image information, when such an input signal is observed with some geometrical change (e.g., rotation change, and change of scale), the matching position is not always specified with good accuracy, thereby resulting in pseudo matching or a possible failure of matching. Moreover, with a one-dimensional input signal including audio information, when such an input signal is observed with some geometrical change (e.g., change of scale), this similarly results in pseudo matching or a possible failure of matching.

A proposition of the application is to provide a template-matching apparatus that can specify the matching position with good accuracy even if an input signal is observed with some geometrical change.

Means for Solving the Problems

A template-matching apparatus of the present invention is provided with a first calculating unit that calculates, for image information of a template image including a plurality of color components, a first characteristic amount from the image information including at least one of colors among the plurality of color components, an extracting unit that extracts a partial image for computation use from a plurality of different positions in an input image including the plurality of color components, a second calculating unit that calculates, for image information of the partial image extracted by the extracting unit, a second characteristic amount from the image information including at least one of colors among the plurality of color components, a third calculating unit that calculates a residual amount from the image information of the template image and the image information of the partial image, a first computing unit that finds a first degree of similarity between the template image and the partial image by comparing the first characteristic amount and the second characteristic amount, a second computing unit that finds a second degree of similarity based on the residual amount, a third computing unit that finds a third degree of similarity based on the first degree of similarity and the second degree of similarity, and a specifying unit that specifies a matching position with the template image in the input image by comparing the third degree of similarity found at each of positions in the input image.

In the configuration, preferably, the first calculating unit may calculate for the image information of the template image the first characteristic amount by performing computation on each of the color components, the second calculating unit may calculate for the image information of the partial image the second characteristic amount by performing computation on each of the color components, the third calculating unit may calculate for the image information of the template image and the image information of the partial image the residual amount by performing computation on each of the color components, the first computing unit may find the first degree of similarity by performing comparison based on the first characteristic amount and the second characteristic amount having the same color components, the second computing unit may find the second degree of similarity by computing the residual amount for each of the color components, and the third computing unit may calculate for the first degree of similarity and the second degree of similarity the third degree of similarity by performing computation on each of the color components.

Another template-matching apparatus of the present invention is provided with a first calculating unit that calculates, for image information of a template image including a plurality of color components, a first characteristic amount either by adding the image information including at least one of colors among the plurality of color components to all of pixels in the template image or by adding the image information including at least one of the colors among the plurality of color components to a part of the pixels in the template image, an extracting unit that extracts a partial image for computation use from a plurality of different positions in an input image including the plurality of color components, a second calculating unit that calculates, for image information of the partial image extracted by the extracting unit, a second characteristic amount either by adding the image information including at least one of colors among the plurality of color components to all of pixels in the partial image or by adding the image information including at least one of the colors among the plurality of color components to a part of the pixels in the partial image, a third calculating unit that calculates a residual amount from the image information of the template image and the image information of the partial image, a first computing unit that finds a first degree of similarity between the template image and the partial image by comparing the first characteristic amount and the second characteristic amount, a second computing unit that finds a second degree of similarity based on the residual amount, a third computing unit that finds a third degree of similarity based on the first degree of similarity and the second degree of similarity, and a specifying unit that specifies a matching position with the template image in the input image by comparing the third degree of similarity found at each of positions in the input image.

In the configuration, preferably, the first calculating unit may calculate the first characteristic amount either by adding the image information of the template image to all of the pixels in the template image for each of the color components or by adding the image information to the part of the pixels in the template image for each of the color components, the second calculating unit may calculate the second characteristic amount either by adding the image information of the partial image to all of the pixels in the partial image for each of the color components or by adding the image information to the part of the pixels in the partial image for each of the color components, the third calculating unit may calculate for the image information of the template image and the image information of the partial image the residual amount by performing computation on each of the color components, the first computing unit may find the first degree of similarity by performing comparison based on the first characteristic amount and the second characteristic amount having the same color components, the second computing unit may find the second degree of similarity by computing the residual amount for each of the color components, and the third computing unit may calculate for the first degree of similarity and the second degree of similarity the third degree of similarity by performing computation on each of the color components.

Also in the configuration, preferably, the computing unit may calculate the first degree of similarity, the second degree of similarity, and the third degree of similarity as long as a difference between the first characteristic amount and the second characteristic amount is equal to or smaller than a predetermined threshold value.

Moreover, the extracting unit may determine a moving amount from a current extraction point to a next extraction point in accordance with the third degree of similarity.

Moreover, the extracting unit may determine a range for extracting the partial image from the input image in accordance with the third degree of similarity.

Moreover, a camera provided with the template-matching apparatus described above is considered effective as a specific implementation of the invention.

Moreover, the one as a result of representing the configuration of the invention through conversion into a template-matching program for implementing on a computer, a process with respect to image data being a processing target is considered also effective.

EFFECT

According to the invention, the matching position can be specified with good accuracy even if an input image is observed with some geometrical change.

DETAILED DESCRIPTION OF THE EMBODIMENTS

In the below, embodiments of the invention are described in detail by referring to the accompanying drawings.

(First Embodiment)

Figure 1:
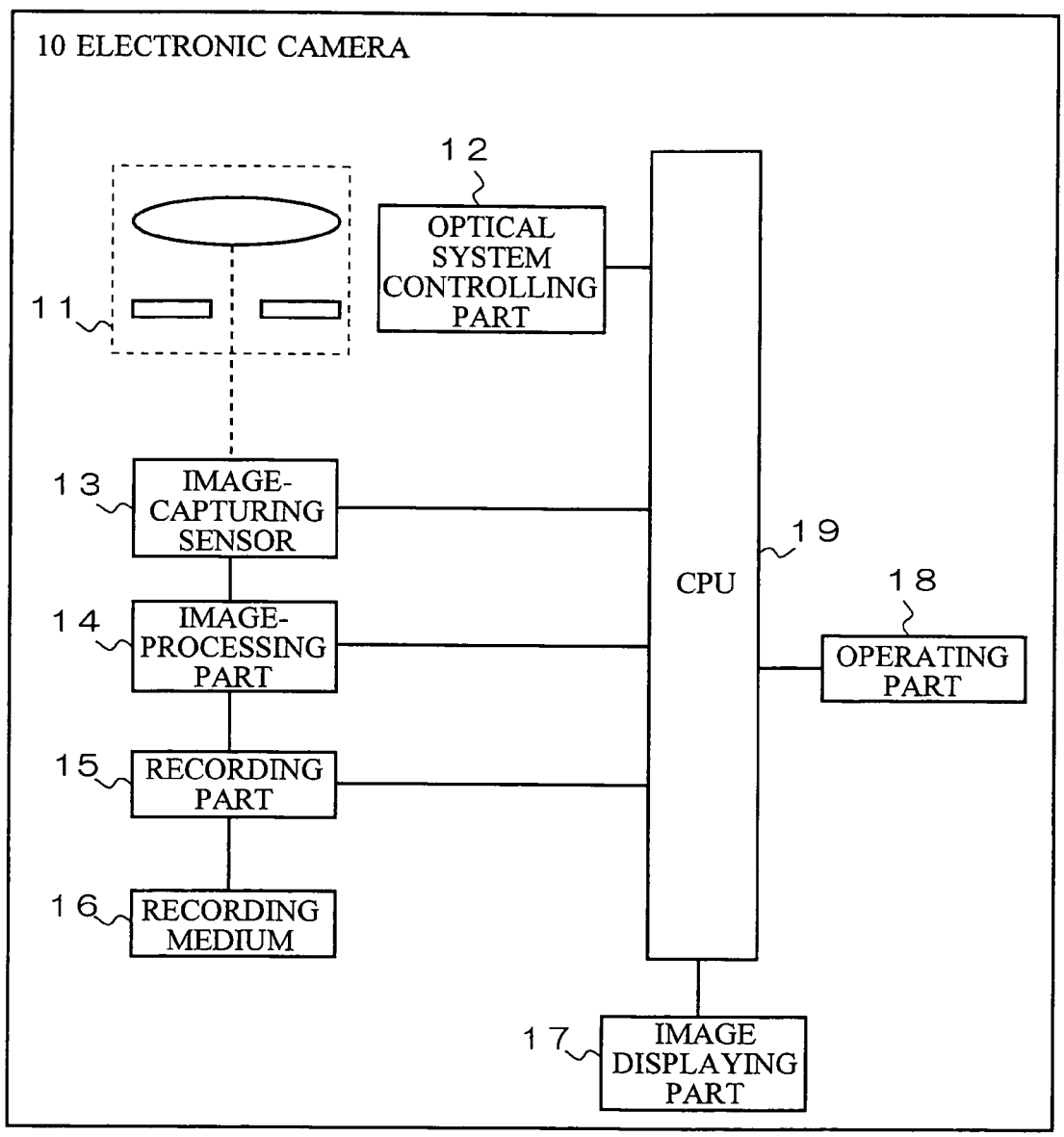
FIG. 1 is a schematic view of an electronic camera 10 of a first embodiment.

Described now is a template-matching apparatus and method of a first embodiment with an example of an electronic camera 10 of FIG. 1. The electronic camera 10 is provided with an optical system 11, an optical system controlling part 12, an image-capturing sensor 13, an image-processing part 14, a recording part 15, a recording medium 16, an image displaying part 17, an operating part 18, and a CPU 19. The optical system 11 includes a lens, an aperture, and others. The optical system controlling part 12 performs control over the aperture and the lens in terms of a focus point position. The image-capturing sensor 13 converts the image of an object formed via the optical system 11 into image data for output to the image-processing part 14. The image-processing part 14 performs various types of digital signal processing including color signal generation, matrix conversion, γ conversion, and correction, for example, for storage into a memory (not shown) as an input image. Herein, the specific method for such various types of image processing is not described. The image-processing part 14 also performs template matching, which will be described later. The recording part 15 records the image data on the recording medium 16. The recording medium 16 is a removable memory such as memory card. The image displaying part 17 displays thereon any image generated by image capturing, and any image recorded on the recording medium 16. The operating part 18 includes a power supply button, a release button, and others (all not shown). The CPU 19 performs control collectively over these component parts. Note here that, using the result of the template matching that will be described later, the CPU 19 performs control such as AF adjustment, AE adjustment, white balance adjustment, main object detection (e.g., face recognition), automatic image capturing, and others. The CPU 19 also detects whether any user operation is made with respect to the operating part 18 or not, and is recorded in advance with a program for execution of such various processing.

Figure 2:
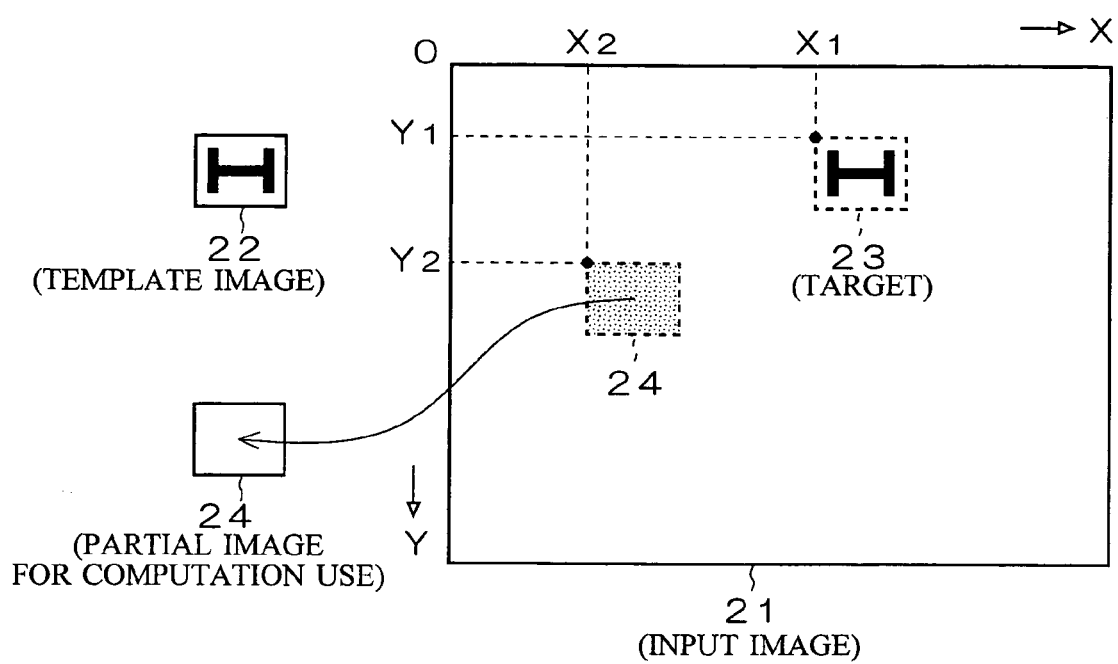
FIG. 2 is a diagram for illustrating an input image 21, a template image 22, a target 23, and a partial image 24 for computation use.

Described next is the template matching in the electronic camera 10. The template matching is a process of searching an input image 21 of FIG. 2 for a partial image (target 23) matching to a known template image 22, and specifying the position of the target 23 (hereinafter, referred to as "matching position $(X_1, Y_1)$", for example. The template matching in the first embodiment is performed in accordance with the procedure of flowcharts of FIGS. 3 and 4 (steps S1 to S14). Herein, the input image 21 is exemplified by an image including a through image generated by image capturing, and an image recorded on the recording medium 16.

Figure 3:
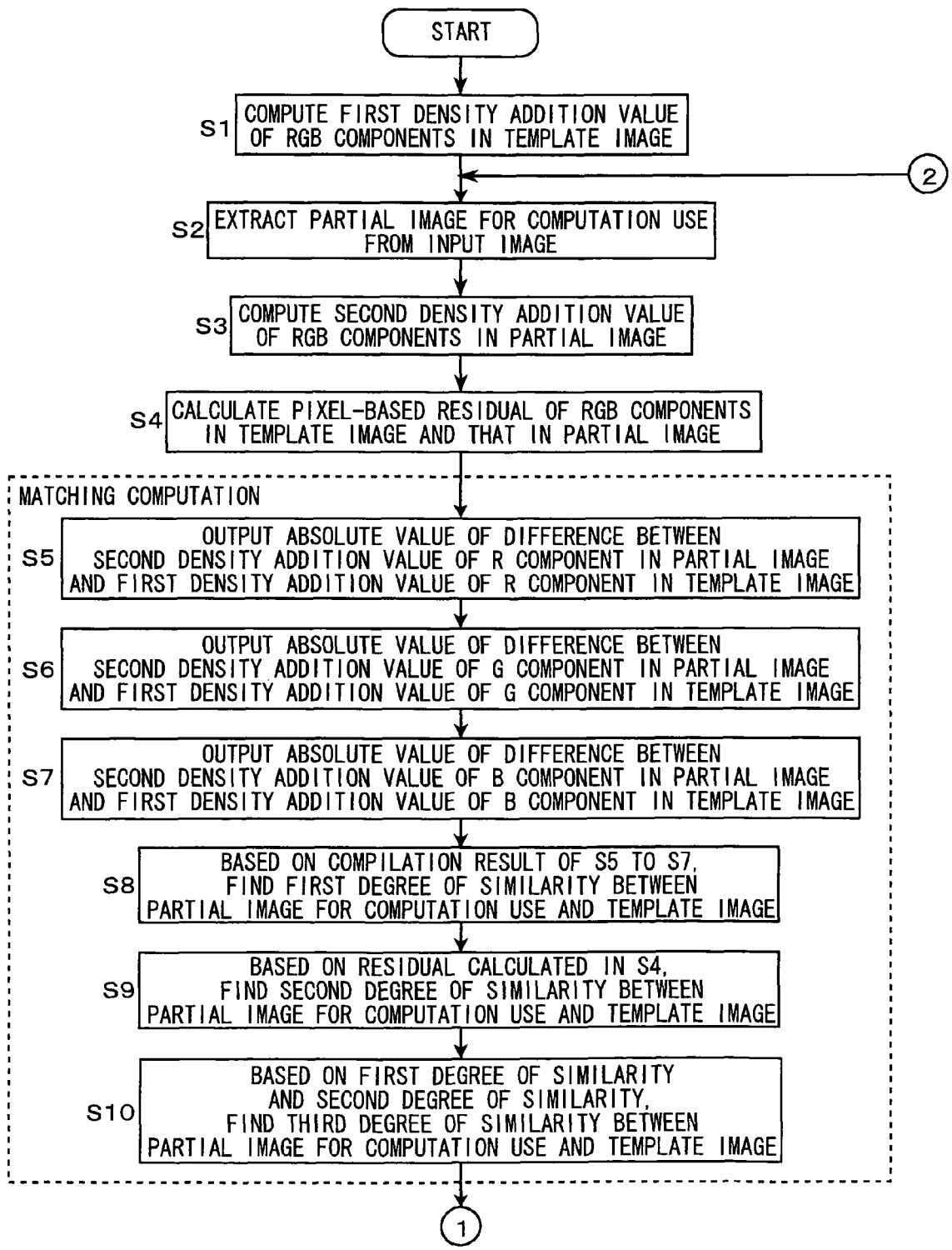
FIG. 3 is a flowchart of the operation of the electronic camera 10 of the first embodiment.
Figure 4:
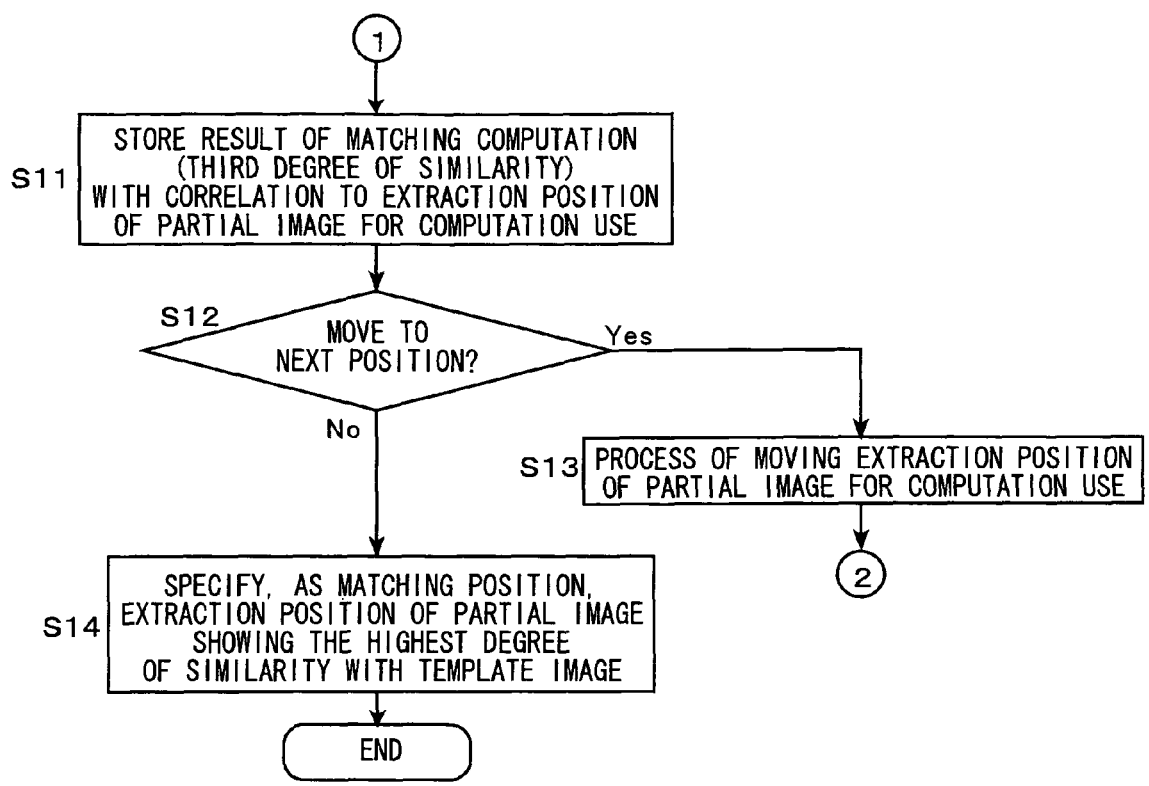
FIG. 4 is another (continued) flowchart of the operation of the electronic camera 10 of the first embodiment.

In the processes of FIGS. 3 and 4, matching computation (S5 to S10) is repeatedly performed between a partial image 24 being the extraction result from the input image 21 for computation use and the template image 22 while the extraction position $(X_2, Y_2)$ of the partial image 24 is being moved little by little. The matching computation (S5 to S10) is computation for finding the degree of similarity between the partial image 24 and the template image 22. The degree of similarity is one of the "indexes related to the similarity" between the partial image 24 and the template image 22, and is "an accurate index related to the similarity".

Moreover, in the processes of FIGS. 3 and 4, the input image 21, the partial image 24 for computation use, and the template image 22 are each assumed as including three color components (that is, RGB components called additive three primary colors or three primary colors of lights). The images (21, 24, and 22) including the RGB components are each a color image.

The processes of FIGS. 3 and 4 (S1 to S14) are described in order.

In step S1, the CPU 19 calculates, for each of the color components, a density addition value $N_{22}$ (hereinafter, referred to as "first density addition value $N_{22}$") of the RGB components from the template image 22 in its entirety.

For example, the first density addition value $N_{22}$ of the R component is calculated by the following Equation 1 using a density value $A_i$ at the position (x, y) of the R component in the template image 22. In the density value $A_i$, "i" denotes the pixel number in the template image 22.

$$N_{22} = \Sigma A_i \qquad \text{Equation 1}$$

Other than the R component, the first density addition value $N_{22}$ of the G component and that of the B component are respectively calculated by the equation similar to the above Equation 1 from the G component and B component in the template image 22 in their entirety.

In step S2, the CPU 19 extracts the partial image 24 from the input image 21 for computation use. The partial image 24 for computation use is in the shape of rectangular with the same size (the same number of pixels) as the template image 22 vertically and horizontally. The partial image 24 for computation use and the template image 22 are both smaller than the input image 21 (have the fewer number of pixels).

In step S3, the CPU 19 calculates, for each of the color components, a density addition value $N_{24}$ (hereinafter, referred to as "second density addition value $N_{24}$") of the RGB components from the entire partial image 24 being the extraction result in step S2 for computation use.

For example, the second density addition value $N_{24}$ of the R component is calculated by the following Equation 2 using a density value $B_i$ at the position (x, y) of the R component in the partial image 24. In the density value $B_i$, "i" denotes the pixel number in the partial image 24.

$$N_{24} = \Sigma B_i \qquad \text{Equation 2}$$

Other than the R component, the second density addition value $N_{24}$ of the G component and that of the B component are respectively calculated by the equation similar to the above Equation 2 from the G component and B component in the partial image 24 in their entirety.

Figure 5:
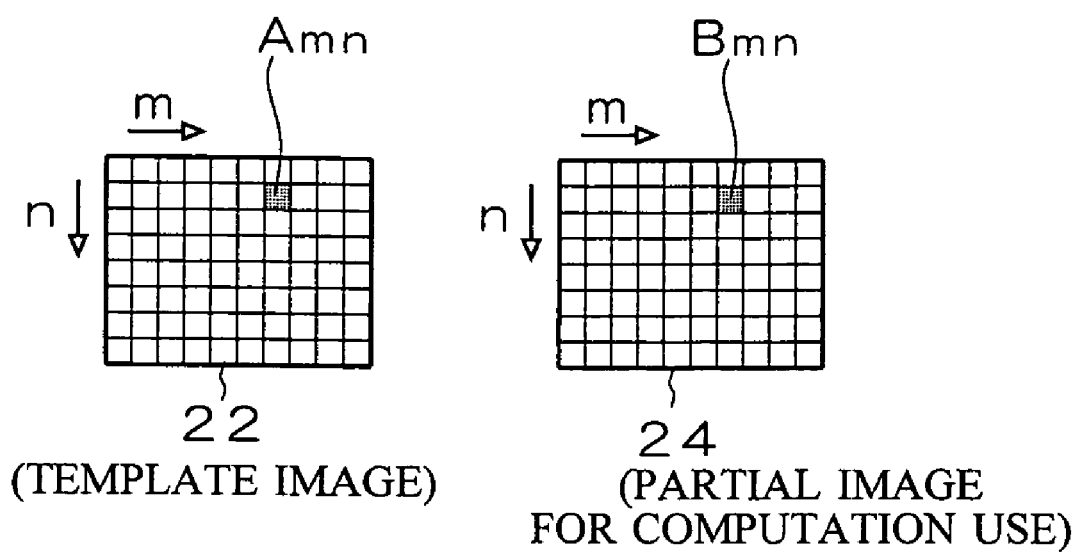
FIG. 5 is a diagram for illustrating a density value Amn at the position (m, n) of the template image 22, and a density value Bmn at the position (m, n) of the partial image for computation use.

In step S4, the CPU 19 calculates, on the pixel basis, the residual of the RGB components in the partial image 24 and that in the template image 22. The residual is calculated by the following Equation 3 using a density value $B_{mn}$ at the position (m, n) of the partial image 24 of FIG. 5, and a density value $A_{mn}$ at the same position (m, n) of the template image 22.

$$\text{Residual} = A_{mn} - B_{mn} \qquad \text{Equation 3}$$

The CPU 19 calculates, on the pixel basis, the residual of the R component (output value $S_R$), the residual of the G component (output value $S_G$), and the residual of the B component (output value $S_B$).

In step S5, the CPU 19 compares the second density addition value $N_{24}$ of the R component of the partial image 24 with the first density addition value $N_{22}$ of the R component of the template image 22, and outputs the absolute value of a difference of the density addition values of these two R components. The output value $T_R$ in this case is an index related to the similarity between the second density addition value $N_{24}$ of the R component and the first density addition value $N_{22}$ thereof.

In step S6, the CPU 19 compares the second density addition value $N_{24}$ of the G component of the partial image 24 with the first density addition value $N_{22}$ of the G component of the template image 22, and outputs the absolute value of a difference of the density addition values of these two G components (output value $T_G$).

In step S7, the CPU 19 compares the second density addition value $N_{24}$ of the B component of the partial image 24 with the first density addition value $N_{22}$ of the B component of the template image 22, and outputs the absolute value of a difference of the density addition values of these two B components (output value $T_B$).

In step S8, the CPU 19 normalizes the output value $T_R$ of the R component in step S5 described above, the output value $T_G$ of the G component in step S6, and the output value $T_B$ of the B component in step S7 by dividing those by the color components $J_R$, $J_G$, and $J_B$ of the first density addition value $N_{22}$, respectively. The average is then calculated for the degrees of similarity $U_R$, $U_G$, and $U_B$ being the calculation results by normalization as such of the respective color components, and the resulting value is used as "the first degree of similarity between the partial image 24 and the template image 22".

The first degree of similarity $r_1$ is expressed by the following Equation 4.

$$r1 = (U_R + U_G + U_B)/3 \qquad \text{Equation 4}$$

In step S9, the CPU 19 finds the second degree of similarity between the partial image 24 and the template image 22.

The second degree of similarity is the minimum residual based on the residuals ($S_R$, $S_G$, $S_B$) of the RGB components calculated in step S4 described above on the pixel basis for the partial image 24 and the template image 22. The CPU 19 calculates, first of all, the minimum residual of each of the color components based on the following Equation 5 or 6.

$$K_R = \min \sum_m \sum_n S_R \qquad \text{Equation 5}$$

$$K'_R = \min \sum_m \sum_n S_R^2 \qquad \text{Equation 6}$$

The Equations 5 and 6 are those for finding the minimum residual $K_R$ (or $K_R'$) of the R component based on the residual (output value $S_R$) of the R component. In Equation 5, $K_R$ denotes the minimum value of the absolute sum of the density differences. In Equation 6, $K_R'$ denotes the minimum value of the square sum of the density differences. The minimum residual $K_R$ or $K_R'$ corresponds to the degree of similarity between the partial image 24 and the template image 22, and the smaller the value (i.e., the residual), the higher the degree of similarity between the partial image 24 and the template image 22, and the closer the extraction position $(X_2, Y_2)$ to the matching position $(X_1, Y_1)$.

Other than the R component, the minimum residual of the G component and that of the B component ($K_G$, $K_B$ or $K_G'$, $K_B'$) are respectively calculated from the G component and the B component of the partial image 24 in their entirety by the equation similar to the Equation 5 or 6 described above. In the below, a description is given by using the minimum residuals ($K_R$, $K_G$, $K_B$) being the calculation results by the Equation 5 described above. Note here that a case of using the minimum residuals ($K_R'$, $K_G'$, $K_B'$) being the calculation results by the Equation 6 described above may be considered similarly.

The CPU 19 then normalizes the color components $K_R$, $K_G$, and $K_B$ of the minimum residuals, respectively. The normalization is performed by dividing the color components $K_R$, $K_G$, and $K_B$ by the area t×200 of the partial image. 200 is a coefficient calculated from experience, and may be adjusted in accordance with the levels of gray, for example, in such a manner that the second degree of similarity $r_S$ that will be described later takes any value of 0 to 1. The average is then calculated for the minimum residuals $H_R$, $H_G$, and $H_B$ being the calculation results by normalization as such of each of the color components, and the resulting value is used as "the second degree of similarity between the partial image 24 and the template image 22".

The second degree of similarity $r_S$ is expressed by the following Equation 7.

$$r_S = (H_R + H_G + H_B)/3 \qquad \text{Equation 7}$$

In step S10, the CPU 19 finds the third degree of similarity between the partial image 24 and the template image 22 based on the first degree of similarity $r_T$ found in step S8 and the second degree of similarity $r_S$ found in step S9.

The third degree of similarity R is found by the following Equation 8.

$$R = w \times r_S + (1-w) \times r_T \qquad \text{Equation 8}$$

In Equation 8, w denotes the weight having the value from 0 to 1. By Equation 8, the weighted average is calculated between the first degree of similarity $r_T$ and the second degree of similarity $r_S$ with the weight of w.

After completion of the matching computation as above (S5 to S10), in step S11, the CPU 19 stores, in a memory, the third degree of similarity R being the result of the matching computation with a correlation to the extraction position $(X_2, Y_2)$ of the partial image 24. After completion of such a procedure of steps S2 to S11, the process is completed with respect to the extraction position $(X_2, Y_2)$ being a part in the input image 21.

In step S12, the CPU 19 determines whether or not to move the extraction position $(X_2, Y_2)$ of the partial image 24 for computation use to the next position. When the CPU 19 determines to move it to the next position, the procedure goes to step S13, and when determines not to move it to the next position, the procedure goes to step S14.

In step S13, the CPU 19 performs the process of moving the extraction position $(X_2, Y_2)$ of the partial image 24 for computation use. The CPU 19 moves the extraction position $(X_2, Y_2)$ of the partial image 24 from the current position to the next position. Thereafter, the procedure returns to the process of step S2, and at the new extraction position $(X_2, Y_2)$, the procedure is repeated for extraction of the partial image 24 for computation use (S2), to calculation of the second density addition value $N_{24}$ of the RGB components (S3), to calculation of the residual of the RGB components (S4), to matching computation (S5 to S10), and to storage of the result (S11.).

As such, by repeating the procedure from step S2 to S14 to S2, and others, while the extraction position $(X_2, Y_2)$ of the partial image 24 for computation use is being moved little by little, the partial image 24 is extracted in a sequential manner at the respective positions so that the matching computation (S5 to S10) can be performed every time the partial image 24 is extracted.

Thereafter, when the extraction position $(X_2, Y_2)$ of the partial image 24 for computation use reaches the end point, and when the processes of steps S2 to S11 are completed thereat, in step S14, the CPU 19 compares, in terms of size, the third degrees of similarity R found at a plurality of different positions in the input image 21, and specifies, as the matching position $(X_1, Y_1)$, the extraction position $(X_2, Y_2)$ of the partial image 24 showing the smallest value and the highest degree of similarity with the template image 22. This is the end of the process of the template matching with respect to the input image 21.

As described above, with the template matching in the first embodiment, the first degree of similarity ($r_T$) is found based on the first density addition value $N_{22}$ of the RGB components and the second density addition value $N_{24}$ thereof, and the second degree of similarity ($r_S$) is found based on the residual of the RGB components. The third degree of similarity (R) is then found based on the first degree of similarity and the second degree of similarity, and the resulting third degree of similarity is subjected to a comparison in terms of size. The first density addition value $N_{22}$ of the RGB components is the characteristic amount of each of the RGB components in the template image 22, and the second density addition value $N_{24}$ of the RGB components is the characteristic amount of each of the RGB components in the partial image 24 for computation use. As such, because the characteristic amount is found as an amount not dependent on the pixel position, even if the input image 21 is observed with some geometrical change (e.g., rotation change, and change of scale), the matching position $(X_1, Y_1)$ can be specified with good accuracy. The third degree of similarity is the characteristic amount reflecting the design of the template image 22 and that of the partial image 24. By using such a characteristic amount, the matching position $(X_1, Y_1)$ can be specified with good accuracy in accordance with the design. Moreover, according to the first embodiment, the template matching is performed using the third degree of similarity having both the advantages of the first degree of similarity being the characteristic amount not dependent on the pixel position, and the advantages of the second degree of similarity being the characteristic amount reflecting the design of the template image 22 and that of the partial image 24, thereby being able to specify the matching position with good accuracy even if the input image is observed with some geometrical change.

Moreover, with the template matching in the first embodiment, the matching computation (S5 to S10) is performed using every color component (i.e., RGB components) included in each of the images (21, 24, and 22). This thus enables to ensure a large amount of information, and the matching position $(X_1, Y_1)$ can be specified with better accuracy.

Note here that the processes in the first embodiment may be additionally provided with the following processes.

1. Process of Matching Cut

After step S7 of FIG. 3, the CPU 19 compares a predetermined threshold value with the output value $T_R$ of the R component, the output value $T_G$ of the G component in step S6, and the output value $T_B$ of the B component in step S7, respectively. When the output value $T_R$ of the R component, the output value $T_G$ of the G component in step S6, and the output value $T_B$ of the B component in step S7 are all equal to or smaller than the predetermined threshold value, the CPU 19 then determines that the extraction position $(X_2, Y_2)$ of the partial image 24 being the extraction result in step S2 is far from the matching position $(X_1, Y_1)$. The procedure then goes to step S11 without the processes from step S8 to S10, and then in step S11, the degree of similarity being the result of the matching computation is set to "out of range", and is stored in the memory with a correlation with the extraction position $(X_2, Y_2)$ of the partial image 24.

As such, only when the difference of the density addition values being the calculation results from steps S5 to S7 is equal to or smaller than the predetermined threshold value, the process of calculating the degree of similarity (the processes from steps S8 to S10) is executed, thereby being able to eliminate any useless processes. As such, with expectations, the template matching process can be executed at a higher speed.

2. Process of Step Control

In step S12 of FIG. 4, when the determination is made to move the extraction position $(X_2, Y_2)$ of the partial image 24 for computation use to the next position, the CPU 19 determines the movement amount from the current extraction position to the next extraction position in accordance with the third degree of similarity R found in step S10.

For moving the extraction position $(X_2, Y_2)$ of the partial image 24 for computation use in the lateral direction, considering the third degree of similarity R at the current position, the CPU 19 calculates the movement amount Mx from the current position to the next position. The specific method for calculating the movement amount Mx conforms to the invention described in WO2005/101313 that has been applied by the applicant of this invention. Calculating such a movement amount Mx can be completed very simply. Moreover, the movement amount Mx found in accordance with the third degree of similarity R becomes often small in value when the third degree of similarity R at the current position is smaller (i.e., closer to "0"), when the similarity is higher between the partial image 24 and the template image 22, and when the extraction position $(X_2, Y_2)$ of the partial image 24 is closer to the matching position $(X_1, Y_1)$. On the other hand, the movement amount Mx becomes often large in value when the third degree of similarity R at the current position is larger (i.e., closer to "1"), when the similarity is lower between the partial image 24 and the template image 22, and when the extraction position $(X_2, Y_2)$ of the partial image 24 is farther away from the matching position $(X_1, Y_1)$.

The maximum value of the movement amount Mx is derived when the third degree of similarity R is "1", and the minimum value of the movement amount Mx is derived when the third degree of similarity R is "0". Note here that when the movement amount Mx found in accordance with the third degree of similarity R is "0 pixel", the actual movement amount is set to "1 pixel".

On the other hand, for moving the extraction position $(X_2, Y_2)$ of the partial image 24 for computation use in the vertical direction, considering the third degree of similarity R at the various positions on the current scanning line, the CPU 19 calculates the movement amount My from the current scanning line to the next scanning line. The specific method for calculating the movement amount My conforms to the invention described in WO2005/101313 that has been applied by the applicant of this invention. Calculating such a movement amount My can be completed very simply. Moreover, the movement amount My found in accordance with the third degree of similarity R becomes often small in value when the third degree of similarity R being average on the current scanning line is smaller (i.e., closer to "0"), when the similarity extracted at the respective positions is higher as average between the partial image 24 and the template image 22, and when the current scanning line is closer to the matching position $(X_1, Y_1)$. On the other hand, the movement amount My becomes often large in value when the third degree of similarity R at the current position is large (i.e., closer to "1"), when the similarity is lower between the partial image 24 and the template image 22, and when the extraction position $(X_2, Y_2)$ of the partial image 24 is farther away from the matching position $(X_1, Y_1)$. The maximum value of the movement amount My is derived when the average value of the third degree of similarity R is "1", and the minimum value of the movement amount My is derived when the average value of the third degree of similarity R is "0". Note here that when the movement amount My found in accordance with the third degree of similarity R is calculated as "0 pixel", the actual movement amount is set to "1 pixel".

As such, in accordance with the third degree of similarity R found in step S10, by determining the movement amount from the current extraction position to the next extraction position, the movement interval can be set with simplicity and appropriateness in accordance with the positional relationship with the matching position $(X_1, Y_1)$ during the template matching. Such a calculation of the movement amount to be performed one by one at the respective positions is very simple, and adding such a calculation does not complicate the process of the template matching.

3. Process of Search Range Control

In step S12 of FIG. 4, when the determination is made to move the extraction position $(X_2, Y_2)$ of the partial image 24 for computation use to the next position, the CPU 19 determines the range for the next extraction of the partial image 24 in accordance with the third degree of similarity R found in step S10 and stored in step S11.

Assuming that the input image 22 has the length of Lx in the X direction, and the length of Ly in the Y direction, with the following Equations 9 and 10, the CPU 19 calculates the length of Ex in the X direction of the range for the next extraction of the partial image 24, and the length of Ey in the Y direction thereof.

$$Ex = (Lx/2) \times R \qquad \text{Equation 9}$$

$$Ey = (Ly/2) \times R \qquad \text{Equation 10}$$

Calculating such a range can be completed very simply. Moreover, the range to be found in accordance with the third degree of similarity R (length of Ex in the X direction, and the length Ey in the Y direction) often becomes narrow when the third degree of similarity R at the current position is smaller (i.e., closer to "0"), when the similarity is higher between the partial image 24 and the template image 22, and when the extraction position $(X_2, Y_2)$ of the partial image 24 is closer to the matching position $(X_1, Y_1)$. On the other hand, this range (length of Ex in the X direction, and the length Ey in the Y direction) often becomes wide when the third degree of similarity R at the current position is larger (i.e., closer to "1"), when the similarity is lower between the partial image 24 and the template image 22, and when the extraction position $(X_2, Y_2)$ of the partial image 24 is farther away from the matching position $(X_1, Y_1)$.

As such, the range (length of Ex in the X direction, and length Ey in the Y direction) for the next extraction of the partial image 24 is determined in accordance with the third degree of similarity R found in step S10, thereby being able to set the range with simplicity and appropriateness in accordance with the positional relationship with the matching position $(X_1, Y_1)$ during the template matching. Such a calculation of the range to be performed one by one at the respective positions is very simple, and adding such a calculation does not complicate the process of the template matching.

The processes of 1 to 3 described above may be executed each separately, or may be executed in combination.

Note here that, in the first embodiment described above, in step S8 of FIG. 3, after normalizing the output values of steps S5 to S7, the average value thereof is calculated, and the resulting value is set to the "first degree of similarity $r_T$", but the invention is surely not restrictive thereto. Alternatively, after normalizing the output values of steps S5 to S7, the sum thereof $(=(U_R+U_G+U_B))$ may be calculated, and the resulting value may be set to the "first degree of similarity $r_T$". In a case with the sum $(=(U_R+U_G+U_B))$, the smaller the value thereof, the higher the similarity between the partial image 24 and the template image 22, and the closer the extraction position $(X_2, Y_2)$ of the partial image 24 to the matching position $(X_1, Y_1)$.

Moreover, in the first embodiment described above, in step S9 of FIG. 3, after normalizing the minimum residuals of each of the color components being the calculation results in step S4, the average value thereof is calculated, and the resulting value is set to the "second degree of similarity $r_S$", but the invention is surely not restrictive thereto. Alternatively, after normalizing the minimum residuals of each of the color components being the calculation results in step S4, the sum thereof $(=(H_R+H_G+H_B))$ may be calculated, and the resulting value may be set to the "second degree of similarity $r_T$". In a case with the sum $(=(H_R+H_G+H_B))$, the smaller the value thereof, the higher the similarity between the partial image 24 and the template image 22, and the closer to the extraction position $(X_2, Y_2)$ of the partial image 24 to the matching position $(X_1, Y_1)$.

Moreover, in the first embodiment described above, exemplified is the case of using the addition value being the result of adding together the density values $A_i$ of all of the pixels in the template image 22 and those in the partial image 24, but alternatively, the average value may be used. That is, the possible value may be the one derived by dividing, by the area, the addition value of the density values $A_i$ of all of the pixels in the template image 22 and those in the partial image 24.

Further, in the first embodiment described above, exemplified is the case of adding together the density values $A_i$ of all of the pixels in the template image 22 and those in the partial image 24, but the density values $A_i$ of a part of the pixels may be added together. If this is the case, in the template image 22 and the partial image 24, the density values A of the pixels located at any corresponding positions may be added together.

Still further, in the first embodiment described above, exemplified is the case of finding the various degrees of similarity by subjecting the three color components (i.e., RGB components) to computation on the color component basis, but the invention is surely not restrictive thereto. For example, among the three color components, at least one of the color components (e.g., G component) may be used for the computation to find the various degree of similarity. Moreover, as alternatives to the first density addition value $N_{22}$ of the R component, that of the G component, and that of the B component, the one being the result of adding the density values of the pixels of every color component found in the template image 22 may be used. Similarly, as alternatives to the second density addition value $N_{24}$ of the R component, that of the G component, and that of the B component, the one being the result of adding the density values of the pixels of every color component found in the partial image 24 may be used.

Still further, in the first embodiment described above, exemplified are the images (21, 24, and 22) including the three color components (i.e., RGB components), but the invention is surely not restrictive thereto. The invention is applicable to a case with the two or four or more color components. That is, the invention can be applied to a case where a plurality of color components are included.

Second Embodiment

In a second embodiment, a description is given with an example of a computer.

Figure 6:
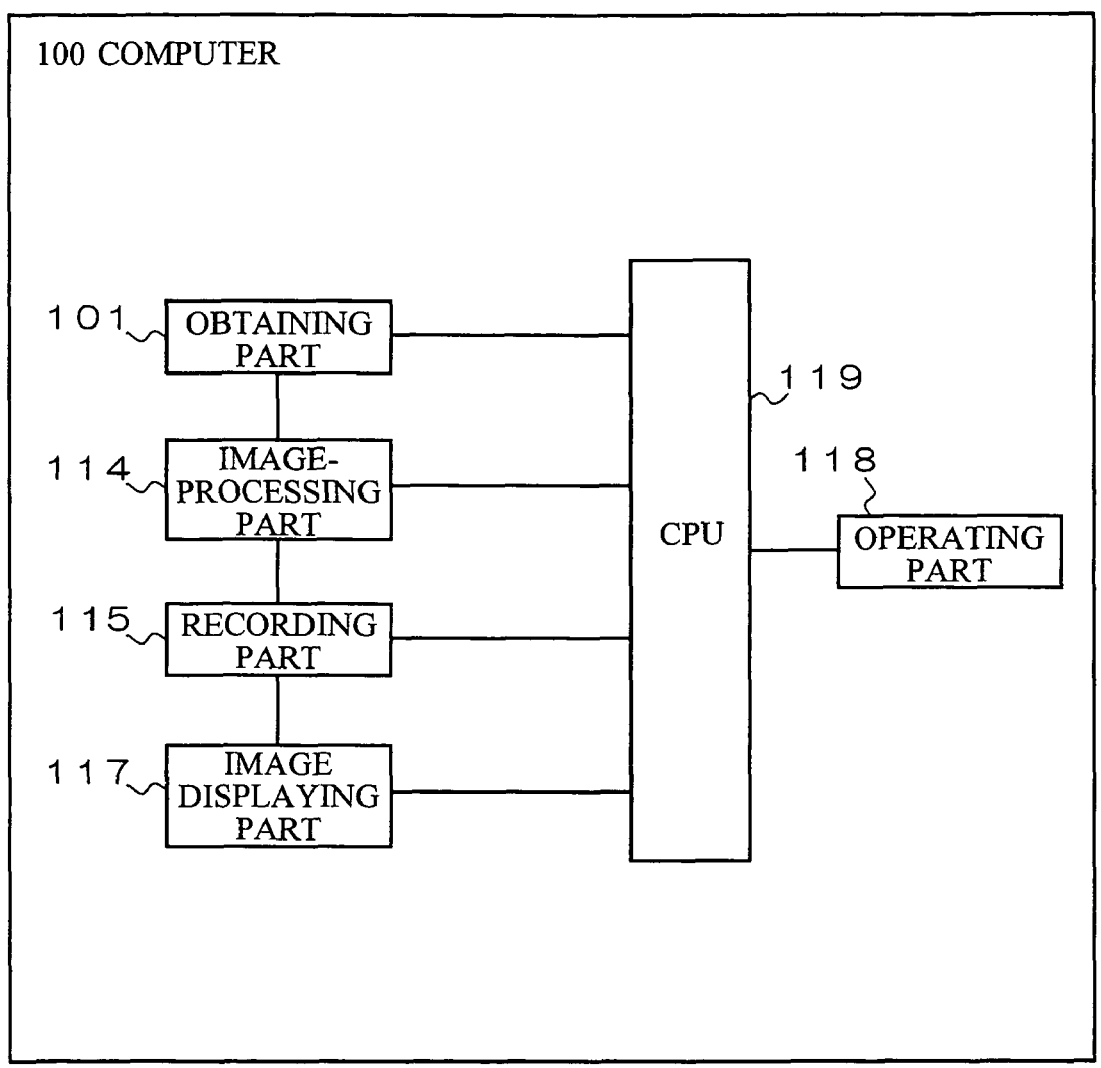
FIG. 6 is a schematic view of a computer 100 of a second embodiment.

FIG. 6 is a diagram showing the configuration of a computer 100 in the second embodiment. As shown in FIG. 6, the computer 100 is provided to include an obtaining part 101, an image-processing part 114, a recording part 115, an image displaying part 117, an operating part 118, and a CPU 119. The acquiring part 101 acquires image data from an external apparatus such as electronic camera or a recording medium by wire or radio, or via a drive for use by the recording medium, for example. The image-processing part 114 is similar to the image-processing part 14 of the first embodiment. The recording part 115 records image data, and others. The image displaying part 117 is provided with image display element such as liquid crystal display element. The operating part 118 includes a power supply button, a mouse, a keyboard, and others. The CPU 119 performs control collectively over these component parts. The CPU 119 is also recorded in advance with a program for execution of such processing.

The CPU 119 is recorded with a program for executing the processes described by referring to the flowcharts of FIGS. 3 and 4 in the first embodiment with respect to images acquired by the acquiring part 101, or images recorded on the recording part 115.

Thereafter, based on a user command issued via the operating part 118, the processes similar to the processes described by referring to the flowcharts of FIGS. 3 and 4 in the first embodiment are executed.

As described above, with the computer 100 of the second embodiment, the effects similar to those in the first embodiment can be achieved.

Moreover, in the embodiments described above, exemplified is the case where the partial image 24 for computation use and the template image 22 both have the shape of rectangular, but the invention is surely not restrictive thereto. The partial image 24 and the template image 22 are not necessarily in the shape of rectangular. Any other shape will lead to the processes essentially the same.

Further, in the embodiments described above, described is the template matching with an example of the electronic camera 10 of FIG. 1, and the computer 100 of FIG. 6, but the invention is surely not restrictive thereto. Other than that, the invention can be applied also to an observation device that observes, inspects, and positions a sample (semiconductor wafer, liquid crystal substrate, printed board, biological specimen (e.g., cell), and others), for example, an electronic microscope that captures images through scanning of the local area of a sample by electronic lines, a surveillance camera, and others. Moreover, the invention can be applied also to a device that captures not only an image of a local area of a sample but also collectively an entire image of the sample. Furthermore, the similar effects can be derived also in a case of implementing a part of the processes described in the first embodiment by a computer through coupling of the electronic camera of the first embodiment to any external computer.

Still further, in the embodiments described above, exemplified is the case of performing the template matching with respect to an input image (two-dimensional input signal including image information), but the application is surely not restrictive thereto. Other than that, the application can be similarly applied also to a case of performing the template matching (signal processing) with respect to a one-dimensional input signal (input audio) including audio information. When such a one-dimensional input signal is a target, the "the density of the image" described above may be considered as an alternative to the "signal strength". If with a one-dimensional input signal, even if an input signal is observed with some geometrical change (e.g., change of scale), the matching position can be specified with good accuracy.

The many features and advantages of the embodiments are apparent from the detailed specification and, thus, it is intended by the appended claims to cover all such features and advantages of the embodiments that fall within the true spirit and scope thereof. Further, since numerous modifications and changes all readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A template-matching apparatus, comprising:
a first calculating unit calculating, for image information of a template image including a plurality of color components, a first characteristic amount from the image information of the template image including at least one of colors among the plurality of color components;
an extracting unit extracting a partial image for computation use from a plurality of different positions in an input image including the plurality of color components;
a second calculating unit calculating, for image information of the partial image extracted by the extracting unit, a second characteristic amount from the image information of the partial image including at least one of colors among the plurality of color components;
a third calculating unit calculating a residual amount from the image information of the template image and the image information of the partial image;
a first computing unit finding a first degree of similarity between the template image and the partial image by comparing the first characteristic amount and the second characteristic amount;
a second computing unit finding a second degree of similarity based on the residual amount;
a third computing unit finding a third degree of similarity based on the first degree of similarity and the second degree of similarity according to a relationship $R = w \times r_s + (1-w) \times r_T$, where w is a weight having a value from 0 to 1, $r_s$ is the second degree of similarity and $r_T$ is the first degree of similarity; and
a specifying unit specifying a matching position with the template image in the input image by comparing the third degree of similarity found at each of positions in the input image.

2. The template-matching apparatus according to claim 1, wherein:
the first calculating unit calculates for the image information of the template image the first characteristic amount by performing computation on each of the color components;
the second calculating unit calculates for the image information of the partial image the second characteristic amount by performing computation on each of the color components;
the third calculating unit calculates for the image information of the template image and the image information of the partial image the residual amount by performing computation on each of the color components;
the first computing unit finds the first degree of similarity by performing comparison based on the first characteristic amount and the second characteristic amount having the same color components;
the second computing unit finds the second degree of similarity by computing the residual amount for each of the color components; and
the third computing unit calculates for the first degree of similarity and the second degree of similarity the third degree of similarity by performing computation on each of the color components.

3. The template-matching apparatus according to claim 1, wherein
the computing unit calculates the first degree of similarity, the second degree of similarity, and the third degree of similarity as long as a difference between the first characteristic amount and the second characteristic amount is equal to or smaller than a predetermined threshold value.

4. The template-matching apparatus according to claim 1, wherein
the extracting unit determines a moving amount from a current extraction point to a next extraction point in accordance with the third degree of similarity.

5. The template-matching apparatus according to claim 1, wherein
the extracting unit determines a range for extracting the partial image from the input image in accordance with the third degree of similarity.

6. A camera comprising the template-matching apparatus according to claim 1.

7. A template-matching apparatus, comprising:
a first calculating unit calculating, for image information of a template image including a plurality of color components, a first characteristic amount either by adding the image information of the template image including at least one of colors among the plurality of color components to all of pixels in the template image or by adding the image information of the template image including at least one of the colors among the plurality of color components to a part of the pixels in the template image;
an extracting unit extracting a partial image for computation use from a plurality of different positions in an input image including the plurality of color components;
a second calculating unit calculating, for the image information of the partial image extracted by the extracting unit, a second characteristic amount either by adding the image information of the partial image including at least one of colors among the plurality of color components to all of pixels in the partial image or by adding the image information of the partial image including at least one of the colors among the plurality of color components to a part of the pixels in the partial image;

a third calculating unit calculating a residual amount from the image information of the template image and the image information of the partial image according to a relationship Residual=$A_{mn}-B_{mn}$, where $B_{mn}$ is a density value at a position of the partial image and $A_{mn}$ is a density value at a same position of the template image;

a first computing unit finding a first degree of similarity between the template image and the partial image by comparing the first characteristic amount and the second characteristic amount;

a second computing unit finding a second degree of similarity based on the residual amount;

a third computing unit finding a third degree of similarity based on the first degree of similarity and the second degree of similarity; and a specifying unit specifying a matching position with the template image in the input image by comparing the third degree of similarity found at each of positions in the input image.

8. The template-matching apparatus according to claim 7, wherein:

the first calculating unit calculates the first characteristic amount either by adding the image information of the template image to all of the pixels in the template image for each of the color components or by adding the image information of the template image to the part of the pixels in the template image for each of the color components;

the second calculating unit calculates the second characteristic amount either by adding the image information of the partial image to all of the pixels in the partial image for each of the color components or by adding the image information of the partial image to the part of the pixels in the partial image for each of the color components;

the third calculating unit calculates for the image information of the template image and the image information of the partial image the residual amount by performing computation on each of the color components;

the first computing unit finds the first degree of similarity by performing comparison based on the first characteristic amount and the second characteristic amount having the same color components;

the second computing unit finds the second degree of similarity by computing the residual amount for each of the color components; and the third computing unit calculates for the first degree of similarity and the second degree of similarity the third degree of similarity by performing computation on each of the color components.

9. A computer readable storage medium that stores a template-matching program causing a computer to execute:

a first calculating step calculating, for image information of a template image including a plurality of color components, a first characteristic amount from the image information of the template image including at least one of colors among the plurality of color components;

an extracting step extracting a partial image for computation use from a plurality of different positions in an input image including the plurality of color components;

a second calculating step calculating, for image information of the partial image extracted by the extracting step, a second characteristic amount from the image information of the partial image including at least one of colors among the plurality of color components;

a third calculating step calculating a residual amount from the image information of the template image and the image information of the partial image;

a first computing step finding a first degree of similarity between the template image and the partial image by comparing the first characteristic amount and the second characteristic amount;

a second computing step finding a second degree of similarity based on the residual amount;

a third computing step finding a third degree of similarity based on the first degree of similarity and the second degree of similarity according to a relationship R=w×$r_s$+(1−w)×$r_T$, where w is a weight having a value from 0 to 1, $r_s$ is the second degree of similarity and $r_T$ is the first degree of similarity; and a specifying step specifying a matching position with the template image in the input image by comparing the third degree of similarity found at each of positions in the input image.

10. A computer readable storage medium storing the template-matching program according to claim 9, wherein:

the first calculating step calculates for the image information of the template image the first characteristic amount by performing computation on each of the color components;

the second calculating step calculates for the image information of the partial image the second characteristic amount by performing computation on each of the color components;

the third calculating step calculates for the image information of the template image and the image information of the partial image the residual amount by performing computation on each of the color components;

the first computing step finds the first degree of similarity by performing comparison based on the first characteristic amount and the second characteristic amount having the same color components;

the second computing step finds the second degree of similarity by computing the residual amount for each of the color components; and the third computing step calculates for the first degree of similarity and the second degree of similarity the third degree of similarity by performing computation on each of the color components.

11. A computer readable storage medium that stores a template-matching program causing a computer to execute:

a first calculating step calculating, for image information of a template image including a plurality of color components, a first characteristic amount either by adding the image information of the template image including at least one of colors among the plurality of color components to all of pixels in the template image or by adding the image information of the template image including at least one of the colors among the plurality of color components to a part of the pixels in the template image;

an extracting step extracting a partial image for computation use from a plurality of different positions in an input image including the plurality of color components;

a second calculating step calculating, for the image information of the partial image extracted by the extracting step, a second characteristic amount either by adding the image information of the partial image including at least one of colors among the plurality of color components to all of pixels in the partial image or by adding the image information of the partial image including at least one of the colors among the plurality of color components to a part of the pixels in the partial image;

a third calculating step calculating a residual amount from the image information of the template image and the image information of the partial;image according to a relationship Residual=$A_{mn}$−$B_{mn}$, where $B_{mn}$ is a density value at a position of the partial image and $A_{mn}$ is a density value at a same position of the template image;

a first computing step finding a first degree of similarity between the template image and the partial image by comparing the first characteristic amount and the second characteristic amount;

a second computing step finding a second degree of similarity based on the residual amount;

a third computing step finding a third degree of similarity based on the first degree of similarity and the second degree of similarity; and a specifying step specifying a matching position with the template image in the input image by comparing the third degree of similarity found at each of positions in the input image.

12. The computer readable storage medium according to claim 11, wherein:

the first calculating step calculates the first characteristic amount either by adding the image information of the template image to all of the pixels in the template image for each of the color components or by adding the image information of the template image to the part of the pixels in the template image for each of the color components;

the second calculating step calculates the second characteristic amount either by adding the image information of the partial image to all of the pixels in the partial image for each of the color components or by adding the image information of the partial image to the part of the pixels in the partial image for each of the color components;

the third calculating step calculates for the image information of the template image and the image information of the partial image the residual amount by performing computation on each of the color components;

the first computing step finds the first degree of similarity by performing comparison based on the first characteristic amount and the second characteristic amount having the same color components;

the second computing step finds the second degree of similarity by computing the residual amount for each of the color components; and the third computing step calculates for the first degree of similarity and the second degree of similarity the third degree of similarity by performing computation on each of the color components.

* * * * *